(12) United States Patent
Ammons

(10) Patent No.: US 7,427,178 B2
(45) Date of Patent: *Sep. 23, 2008

(54) TOOL AND METHOD FOR INSTALLATION OF ELECTRICAL CONDUIT

(76) Inventor: James Ammons, 2433 Guilbeau La., Seabrook, TX (US) 77586

( * ) Notice: Subject to any disclaimer, the term of this patent is extended or adjusted under 35 U.S.C. 154(b) by 469 days.

This patent is subject to a terminal disclaimer.

(21) Appl. No.: 11/218,158

(22) Filed: Sep. 1, 2005

(65) Prior Publication Data

US 2007/0048089 A1     Mar. 1, 2007

(51) Int. Cl.
*F16L 1/028* (2006.01)
(52) U.S. Cl. ..................................... 405/184
(58) Field of Classification Search ................ 405/184
See application file for complete search history.

(56) References Cited

U.S. PATENT DOCUMENTS

| | | | | |
|---|---|---|---|---|
| 3,214,920 A | * | 11/1965 | Jacobs | 405/184 |
| 5,207,533 A | * | 5/1993 | Federspiel et al. | 405/156 |
| 7,207,749 B2 | * | 4/2007 | Lafontaine | 405/184 |
| 7,267,506 B1 | * | 9/2007 | Ammons et al. | 405/184 |
| 7,270,500 B1 | * | 9/2007 | Ammons et al. | 405/184 |
| 7,275,892 B2 | * | 10/2007 | Ammons | 405/184 |

OTHER PUBLICATIONS

Li, Richard "Installing an Irrigation System? Consider Boring", p. 2; Paragraphs 2-4.

* cited by examiner

*Primary Examiner*—John Kreck
(74) *Attorney, Agent, or Firm*—Buskop Law Group, PC; Wendy Buskop

(57) ABSTRACT

A tool for use in the installation of electrical conduit. The tool consists of a probe having a tapered end, an anvil end and a central body. Pipe is slid over the central body forming a pipe and probe assembly which can be installed in soil traversing beneath an immovable structure by impacting the anvil end, such as with a jack hammer. A method for installing using the tool is also contemplated herein.

18 Claims, 8 Drawing Sheets

TOOL AND METHOD FOR INSTALLATION OF ELECTRICAL CONDUIT

FIELD

The present embodiments relate to handheld tools for use in connection with the installation of electrical conduit under immovable objects and then connection of the electrical conduit to landscape lighting and other electrical systems. The tools have utility in connection with positioning pipe for carrying electrical wires under an immovable structures like a concrete sidewalk.

BACKGROUND

Electric lighting has long been used in landscape decoration and as a safety system around a house. Often, in places of residence, a house, driveway, walkway or some other hard immovable structure already exists which makes placement of new electrical lines difficult as they often need to be buried in the earth. They are unable to string the wires from poles because of winds or other weather phenomena.

Outdoor lighting system in some communities, must be wired using underground electric wire because of local rules and/or laws. Installing electrical systems in soil where houses and structures are already in place is difficult. Accordingly, these houses and preexisting dwellings may have less security because electricity can not be easily connected to portions of land because of pre existing immovable objects, such as a driveway.

A need exists for a tool and a method to install electrical conduit which is fast, easy to use, and works with preexisting structures that are immovable, such as preexisting sidewalks, driveways, and other similar structures.

Conventional installation of underground electrical systems involves placing a main conduit with secondary conduits branching out from the main conduit into the ground to deliver power to a desired area. Various methods and devices have been used to put the conduits and their branches in the ground but these require motorized boring instruments and drills that produce a safety hazard for a worker and a lot of noise for the neighborhood.

A need exists for a handheld device that could be used to easily install electrical conduit of a consistent correct diameter to which landscape or security lighting can then be connected by installing electrical wiring through pipe installed under the surface of the soil.

A need exists for a new and improved electrical installation method that can install electrical conduit under an hard structure manually.

The present embodiments meet these needs.

BRIEF DESCRIPTION OF THE DRAWINGS

The detailed description will be better understood in conjunction with the accompanying drawings as follows.

DETAILED DESCRIPTION OF THE EMBODIMENTS

Figure 1A:
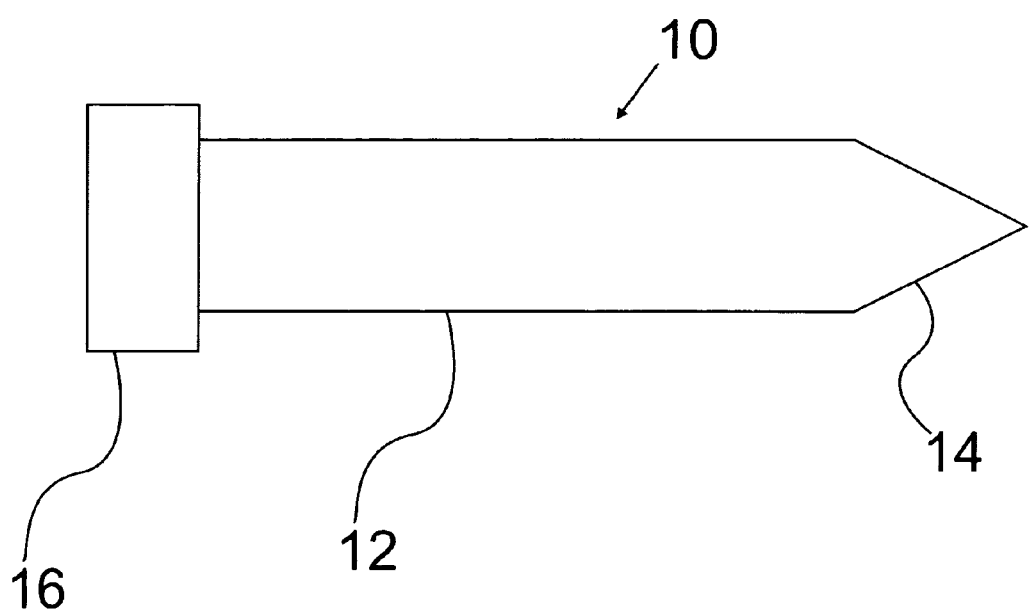
FIG. 1A depicts a top view of the tool of the present embodiment in a position ready for use in an installation.

Before explaining the present embodiments in detail, it is to be understood that the embodiments are not limited to the particular embodiments and that they can be practiced or carried out in various ways.

The present embodiments are new and improved tools that can easily and consistently install generally inflexible pipe beneath hard structures for electrical wiring. The hard structures are contemplated to be immovable structures, such as concrete walkways, concrete driveways, water pipes, sewer pipes, portions of houses, portions of garages, fencing or other immovable structures.

The tools are designed to enable installation of the pipe under the immovable structure by traversing beneath the immovable structure such that each end of the pipe is accessible from either side of the immovable structure.

The tools can be used to install pipe horizontally or vertically without affecting the immovable structure.

The tools include a probe with a central body having a tapered end and an anvil end. Pipe is slid over the central body along the axis of the central body of the probe forming a tight fitting sleeve of pipe around the central body.

The assembly of pipe and probe are placed in a narrow trench adjacent an immovable structure with the tapered end of the probe pointing beneath the immovable structure. The anvil end is impacted, such as with a packer, electrical, pneumatic, hydraulic, or mechanical, pneumatic or hydraulic and the probe with pipe is driven into the earth beneath the immovable structure, which can be, as an example, a concrete walkway. The probe is removed when the tapered end becomes visible or accessible on the end of the probe opposite the anvil end. The probe is pulled, anvil end, from the pipe, leaving the pipe in the ground traversing beneath the structure, such as the walkway. The electrical system is then passed into the pipe to provide power.

The embodied methods save significant time in installing pipe. The methods save labor costs because time is saved when installing the electrical conduit and the present embodiment makes it easier to install electrical conduit than before. By using these methods, common injuries that occur on the job such as when using current boring techniques under sidewalk are prevented.

The present embodiments enable just one person to install electrical conduit when at least two or three people are needed with conventional techniques.

Another advantage of the present embodiment is that no power or water is needed to perform the pipe install.

The methods contemplate creating a narrow trench, which in fact stays dry. The narrow trench permits electrical conduit connection immediately after installation without concern for electrocution. In contrast to the current techniques, some trenches are created for electrical conduit using high pressure water, which is wasteful for the water, plus increases installation time unnecessarily, as the wet trench has to dry out before the installed pipe can have electrical wires placed in it.

The present method not only shortens wait time, but more importantly, prevents the excessive use of water to create the narrow trench used in the method of installation.

The present embodiments of the methods save time during installation by at least 50% as the method does not require cleaning out of the installed pipe, which occurs with common boring technology.

The present embodiments are dramatically less expensive than conventional boring as no expensive drill bits with a drill are needed with the process. Manual whacking of the anvil end with a sledge hammer will suffice for installation of the probe under the immovable structure. No gas powered packers are necessarily needed although they can be used for very large pipe with a large diameter probe.

These handheld tools can be used to enable secure placement of electrical conduit without having to remove a hard structure.

The embodied methods contemplate that an installer can use a packer to pound the anvil side of the probe into the soil to form the installed pipe. A hydraulic packer or a pneumatic packer, such as a jack hammer, can be used. An electrical packer with a ram or a hand held packer, like a sledge hammer, can be used in different embodiments.

The benefit of the present embodiments is that hard immovable structures, such as concrete, no longer need to be destroyed in order to install an electrical system to provide increased safe lighting around a structure. Previously, land owners with hard immovable structures on their property would either have to go without an electrical system or destroy the hard structure just so that they could install an electrical system. The present embodiment solves this problem by providing a means to install an electrical system without the need of destroying hard structures.

The method contemplates digging a narrow trench. This narrow trench can be between 1 and 4 feet wide depending on the diameter of the probe used and pipe needing to be installed. This narrow trench can be generally at an angle to the immovable structure to traverse beneath or across the immovable structure. For example, the trench can be at a 90 degree angle to the side of a concrete sidewalk to enable the installed pipe to traverse beneath the sidewalk.

Pipe is slid around the probe with the tapered end and anvil end forming an assembly. The anvil end of the assembly is repeatedly hit with a packer, such as a jack hammer, and in about 30 seconds, or maybe 1 minute, or possible even 15 seconds, the probe with pipe are installed beneath the immovable structure, the concrete walkway. The anvil end is then gripped, and the probe is pulled out from the pipe, leaving the pipe installed under the walkway clear of any dirt within the pipe/conduit. Electrical wires can be fed into the conduit and connected to provide power.

Figure 1B:
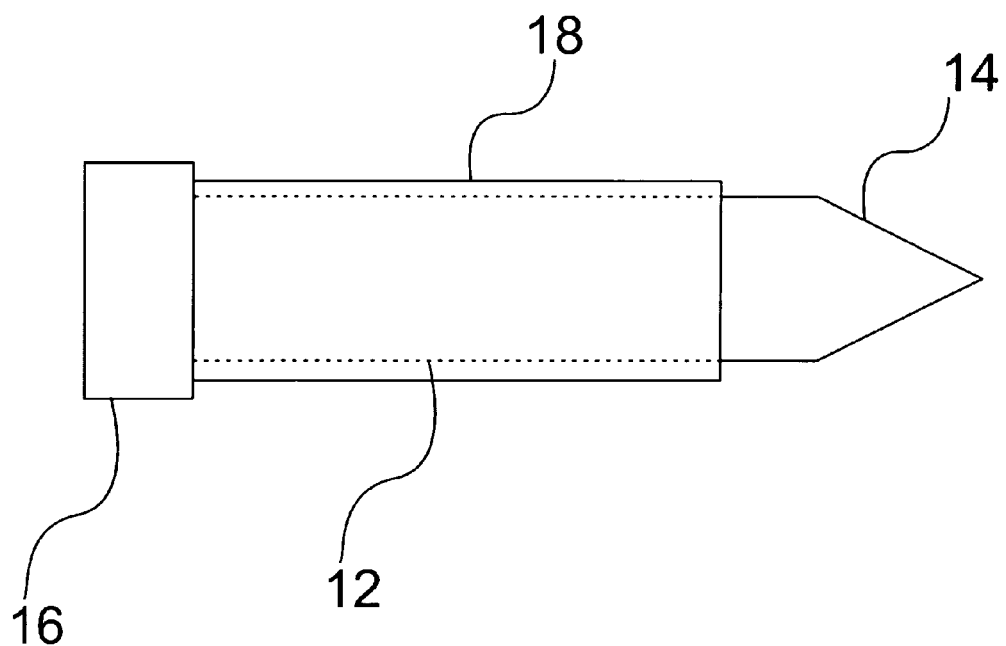
FIG. 1B depicts the tool with pipe disposed around it according to an embodiment of the present invention.

Referring now to the drawings, FIG. 1A and FIG. 1B are embodiments of a tool. FIG. 1A depicts the probe and FIG. 1B depicts the probe and a pipe adapted to fit flush over the probe.

In FIG. 1A, the tool (10) is shown with a central body (12) a tapered end (14) and an anvil end (16). The anvil end has a diameter that extends beyond the diameter of the central body (12).

In FIG. 1B, the pipe (18) has only a slightly larger diameter than the probe and is slid over the central probe like a sleeve. The pipe (18) has a tight fit with the central body so that dirt and other particles can not pack into a gap between the pipe (18) and the central body (12).

Figure 1C:
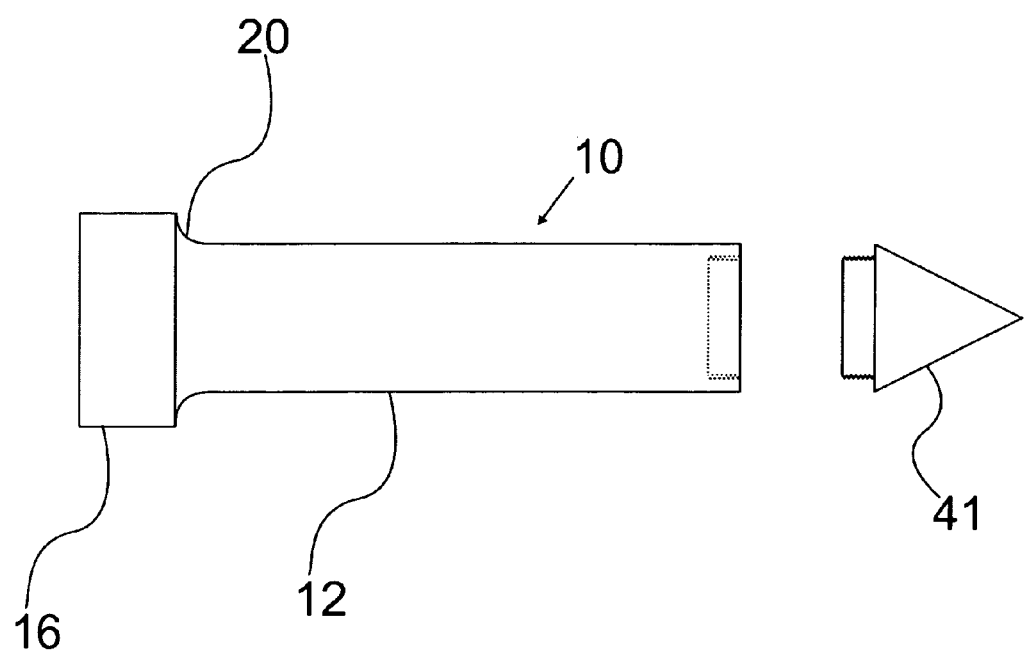
FIG. 1C is an exploded perspective view of an embodiment of a tool for use in an installation.

In FIG. 1C, the tool (10) has a central body (12) a removable tapered end (14) and an anvil end (16). In this embodiment, the central body has tapered shoulders (20) between the central body and the anvil end. The tapered prevent packing of dirt between the pipe and the anvil end.

The pipe (18) in one embodiment can be made of a polyvinyl chloride (PVC), another hard crystalline polymer such as a polyamide composite, or a metal, or a coated metal resistant to rusting and corrosion.

The pipe (18) can have a diameter between 0.5 inches and 2.5 inches, and a length of between 0.5 foot and 100 feet depending on the diameter of the pipe (18) used, the type of packer used, the characteristics of the soil through which the pipe (18) is installed and the needs of the landowner. For example, a long thin pipe with ¼ inch inner diameter and 80 feet long would be usable over a long, thin tool 90 feet long with a diameter only slightly less than the diameter of the pipe for an installation, while a fat pipe of 3 inch diameter might only be usable with a short fat tool having length of less than 4 feet.

The wall thickness of the pipe (18) can be between 1/16 inch to over 2 inches in thickness for most water uses, but this wall thickness can be varied depending on the needs of the landowner, the pressure in the pipe (18), or other specification such as being in an earthquake zone, needing to go through soil with bits of granite in it or depending on the type of packer being used to install the pipe (18).

In one embodiment, the present embodiment contemplates a 4.5 foot pipe with a 1 inch diameter of PVC and the tool (10) has a central body (12) with slightly smaller diameter than the pipe (18) with a slightly longer length, of about 5 feet from anvil end (16) to tapered end (14), wherein the pipe (18) creates tight fit around the central body (12).

For this embodiment, the anvil end (16) of the tool (10) is about 2.5 inches in diameter and has a thickness of 1.5 inches and the anvil end (16) is welded to the central body (12). The anvil end (16) can be made of stainless steel, and the central body (12) is made from carbon steel, a different material. In an alternative embodiment, the anvil end (16) and the central body (12) with a tapered portion can be made of the same material, cold rolled steel, iron, alloys thereof, or stainless steel. The anvil end (16) is secured to the central body (12) by a means other than by welding, still having a usable tool for installation purposes.

For this embodiment, the probe (10) can have a 1 inch tapered end (14) that tapers to a point using about a 20 degree slope. The tapered end (14) is made from the same material as the central body (12) in this embodiment. The tapered end (14) can be removable and re-installable to enable maintenance of the probe if the tapered end (14) became mangled. The central body (12) and tapered end (14) may be made of a high impact, ultraviolet resistant, non-corroding material comprising a polymer, a graphite, a ceramic or combinations thereof.

The tapered end (14) can be flat ended or tapered to a point. The tapered end can be made of a material different from the central body (12), such as a graphite composite, if the probe (10) needed to be pounded through a particularly hard rock. A diamond point can be installed, full of diamond chips, on the probe (10) for difficult soil penetration with high density.

The anvil end (16) for this embodiment is contemplated to be welded onto the central body (12) on one side and have a flat face on the side opposite the central body (12). The anvil end (16) with the flat face is of a thickness which enables the anvil end (16) to sustain repeated impacts of at least 20 pounds per square inch without deformation.

The probe (10) can be made of different metals, and different metal alloys, so long as the material is substantially non-deforming, and does not rust significantly and can take daily field use and exposure to weather.

The probe (10) can have a light coating disposed on the probe, or be painted, or otherwise coated to prevent degradation in the present of rain, sun, and friction damage.

In another embodiment, the probe (10) could have a coating of a material, such as of a white oil or an easily degradable non-toxic lubricant, such as a vegetable oil, to assist in the prevention of corrosion while enabling otherwise snug fitting piping to slide off the probe more easily after installation and pounding is complete.

The probe (10) can have a diameter of less than 1 inch in the central body (12) in a preferred embodiment.

The probe (10) can be constructed by welding the anvil end (16) to the central body (12) at an angle that is substantially perpendicular to the central body (12).

In another embodiment, the anvil end (16) can have tapered shoulders (20) to facilitate the probe's insertion into the earth or hard soil, and to survive pounding into the narrow trench traversing the immovable structure. These tapered shoulders (20) would enable dirt to flow away from the probe and not permit earth from packing around the anvil end (16) between the pipe (18) and the anvil end (16), thereby facilitating insertion under an immovable structure such as sewer or drainage pipes.

The anvil end (16) can be the same material as the central body (12), or a different material so long as the material selected can sustain repeated impacts to the side of the anvil end (16) opposite the central body (12).

Figure 2:
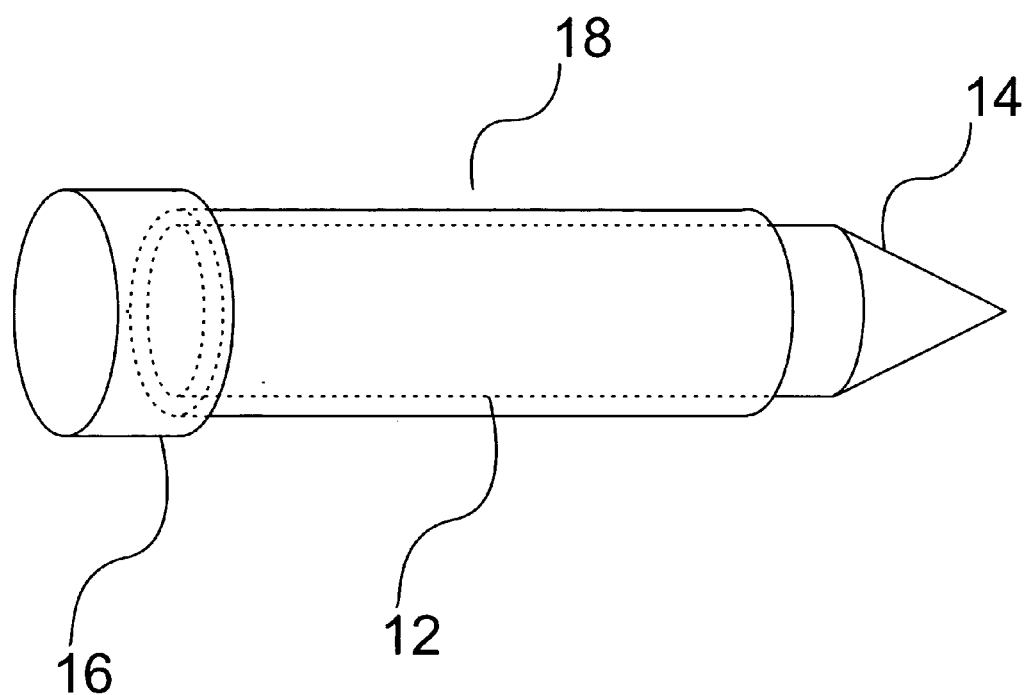
FIG. 2 depicts a perspective view of the tool of the present embodiment in a position ready for use in an installation.

FIG. 2 depicts a perspective view of the probe (10) with the anvil end (16), the central body (12), and the tapered end (14) with pipe (18) surrounding the central body along (12) a central axis. The anvil end (16), tapered end (14) and central body (12) are integral with each other, welded or otherwise non-removably connected together in this embodiment.

Figure 3:
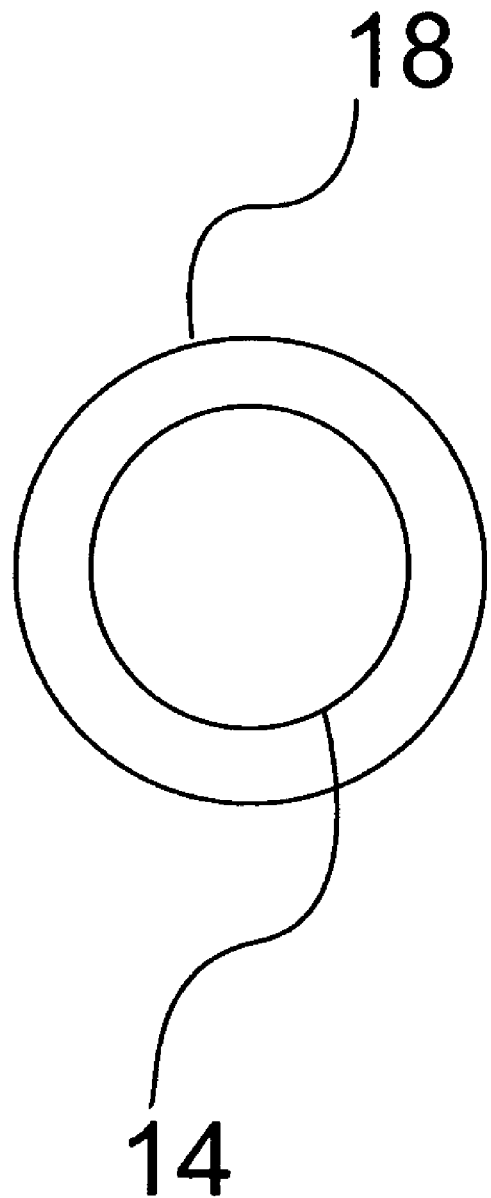
FIG. 3 depicts a front view of the tool viewing down the tapered end with the pipe disposed around the probe used in the present embodiment.

FIG. 3 depicts a front view of the probe (10) viewing down the tapered end (14) with the pipe (18) disposed around the central body (12).

Figure 4:
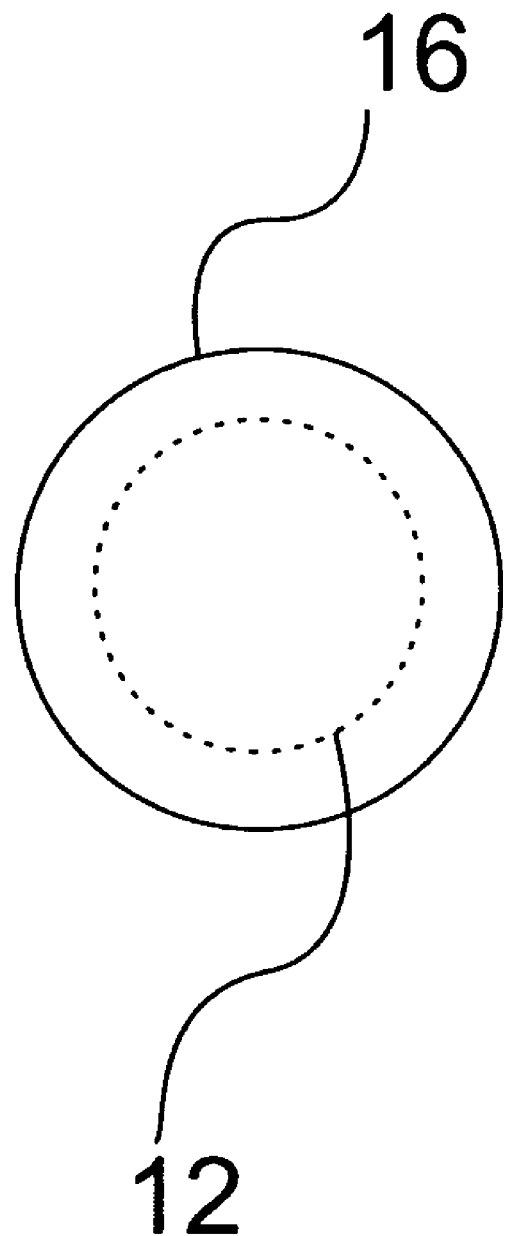
FIG. 4 depicts a rear view of the tool, from the anvil end of the probe.

FIG. 4 depicts a rear view of the probe (10), from the anvil end (16) of the probe showing a flat face of the anvil end with a depression for receiving a pneumatic packer head. The anvil end (16) of this embodiment has a diameter of at least 2 inches and a thickness sufficient to sustain repeated impact without deformation. In another embodiment, the anvil end (16) can have a diameter no greater than 3 times the diameter of the central body (12). In a preferred embodiment, the anvil end (16) has a diameter between 2 times and 2.5 times the diameter of the central body (12), such as a diameter of between 2 inches and 4 inches. It is also contemplated that the anvil end (16) is cylindrical in shape.

In an embodiment of the method, a user digs a narrow trench, which can be as narrow as 3 inches and as deep as 6 feet. The narrow trench is at an angle to an immovable structure like a sidewalk, such as between 60°-90° degrees from an edge of an immovable structure.

The user places a desired piece of pipe (18) snugly over the central body (12) of the probe (10) by sliding the pipe (18) over the integral tapered end (14) until the central body (12) was covered along the axis of the central body forming a pipe and probe assembly. For this embodiment, the pipe (18) has a diameter sufficient to releasably envelope the central body (12) without a sufficient gap, or much of a space. Also it should be noted that the pipe (18) is disposed around the central body (12) along the axis of the central body.

The tool, or the pipe and probe assembly, is placed in the narrow trench to traverse beneath or around an immovable structure, such as to go under a walkway upon completion of the installation.

The user can use a packer, such as electric packer or a hammer, to pound one side of the anvil end (16) of the probe (10) pushing the pipe and probe assembly into the soil beneath or traversing around the immovable structure.

Once the probe and pipe assembly are at the correct location, with the tapered portion of the probe (10) exposed or accessible after traversing the immovable structure, the probe (10) can be pulled from the anvil end (16) and reused. The pipe (18) is left in the ground.

In another embodiment, a second pipe, which is narrower than the installed pipe, can be fed into the installed pipe forming a double walled structure with enhanced insulation, particularly useful for colder climates. Alternatively, drip water tubing could then be fed into the installed pipe and run beneath the immovable structure.

This method enables an average 160 pound man in decent shape to install a 4.5 foot n 1 inch diameter PVC pipe in gumbo soil, such as the kind in Houston, Tex., in 30 seconds using a sledge hammer and this tool.

Figure 5:
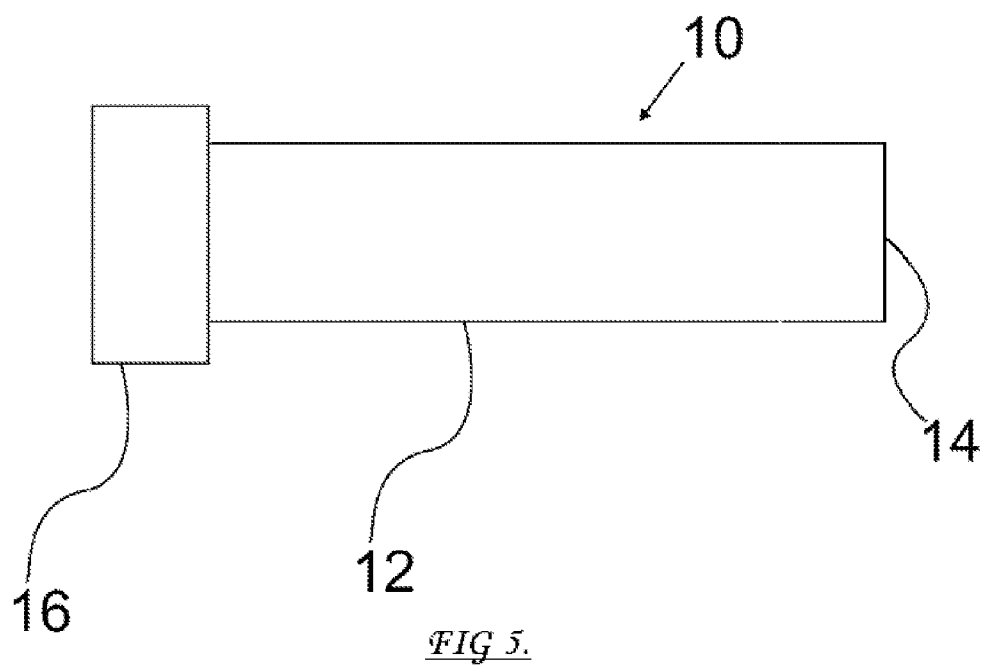
FIG. 5 depicts an embodiment of the tool having a flat face.

FIG. 5 depicts an embodiment of the tool (10), shown with central body (12), anvil end (16), and a tapered end (14) having a flat face.

Figure 6:
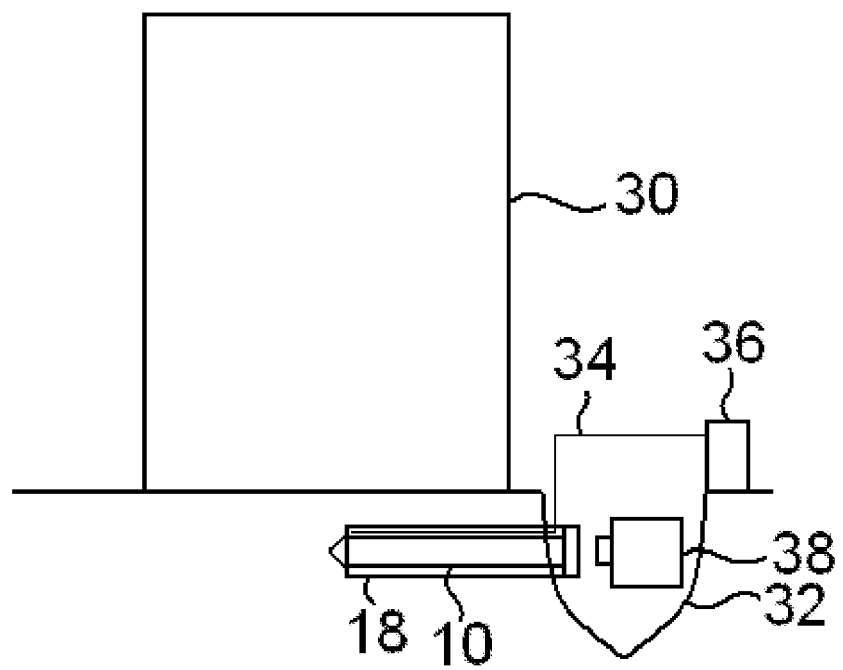
FIG. 6 depicts an embodiment of the tool during use installing electrical conduit.

FIG. 6 depicts an embodiment of the tool (10) during installation of electrical wiring (34). The tool is positioned within a trench (32) adjacent a structure (30). The tool has a pipe (18) disposed thereon for use containing the electrical wiring (34). The electrical wiring (34) is connected to an electrical conduit system (36). A packer (38) is used to impact the tool (10) to drive the tool (10) with the pipe (18) and electrical wiring (34) beneath the structure (30).

While these embodiments have been described with emphasis on the embodiments, it should be understood that within the scope of the appended claims, the embodiments might be practiced other than as specifically described herein.

What is claimed is:

1. A tool for installing electrical conduit comprising:
   a. a probe comprising:
      1. a central body with an axis;
      ii. a tapered end; and
      iii. an anvil end integrally connected to the central body as a one piece unit;
   b. a pipe adapted to fit flush over the central body;
      wherein the probe is inserted in the ground, wherein the probe is removed leaving an electrical conduit installed in the ground without particles in the electrical conduit.

2. The tool of claim 1, wherein the pipe fits flush against the anvil end to prohibit particles from packing between the pipe and the central body.

3. The tool of claim 1, wherein the anvil end comprises a diameter of at least 2 inches and a thickness sufficient to sustain repeated impact without deformation.

4. The tool of claim 3, wherein the anvil end has a diameter of between about 2 inches and about 4 inches.

5. The tool of claim 1, wherein the anvil end comprises a diameter no greater than 3 times the diameter of the central body.

6. The tool of claim 4, wherein the anvil end has a diameter between about 2 times and about 2.5 times the diameter of the central body.

7. The tool of claim 1, wherein the anvil end comprises a tapered shoulder between the anvil end and the central body.

8. The tool of claim 1, wherein the anvil end is composed of a material selected from the group consisting of carbon steel, stainless steel, cold rolled steel, iron, alloys thereof, and combinations thereof.

9. The tool of claim 1, wherein the pipe comprises an inner diameter between about 0.5 inch and about 2.5 inches.

10. The tool of claim 1, wherein the probe is composed of a non-deformable material capable of sustaining impacts of at least 20 pounds per square inch.

11. The tool of claim 1, wherein the central body and the tapered end is composed of a high impact, ultraviolet resistant, non-corroding material.

12. The tool of claim 11, wherein the high impact, ultraviolet resistant, non-corroding material is selected from the group consisting of a polymer, a graphite, a ceramic, and combinations thereof.

13. The tool of claim 1, wherein the tapered end is a flat face.

14. The tool of claim 1, wherein the tapered end culminates in a point.

15. The tool of claim 1, wherein the pipe forms a housing for containing smaller diameter electrical conduit tubing.

16. A method for installing electrical conduit beneath an immovable structure, wherein the method comprises the steps of:

a. excavating a narrow trench adjacent the immovable structure at an angle to traverse the immovable structure;
   b. inserting a tool into the narrow trench, wherein the tool comprises a probe and a pipe adapted to fit flush over the probe, wherein the probe comprises a tapered end and an anvil end; and wherein the pipe comprises a length that traverses the immovable structure;
   c. impacting the anvil end that is integrally connected to the central body as a one piece unit to drive the tapered end beneath the immovable structure until the pipe traverses the immovable structure; and
   d. removing the probe, leaving the pipe as thereby forming an installed electrical conduit for engagement with an electrical conduit system.

17. The method of claim 16, wherein the installed electrical conduit is welded to the electrical conduit system.

18. The method of claim 16, wherein the step of impacting is performed using an electrical packer, a hydraulic packer, a pneumatic packer, a manual packer, or combinations thereof.

* * * * *